United States Patent [19]

Kurata et al.

[11] 4,307,276
[45] Dec. 22, 1981

[54] INDUCTION HEATING METHOD FOR METAL PRODUCTS

[75] Inventors: Kazutoshi Kurata; Tadashi Kawaguchi; Osami Ichiko; Hiroshi Uzawa; Kametaro Itoh; Hisashi Kanzaki, all of Kitakyushu, Japan

[73] Assignee: Nippon Steel Corporation, Tokyo, Japan

[21] Appl. No.: 11,931

[22] Filed: Feb. 13, 1979

Related U.S. Application Data

[63] Continuation-in-part of Ser. No. 764,909, Feb. 1, 1977, abandoned.

[30] Foreign Application Priority Data

Jul. 30, 1976 [JP] Japan .................................. 51-91712

[51] Int. Cl.³ .............................................. H05B 6/06
[52] U.S. Cl. .............................. 219/10.41; 219/10.77; 219/10.71; 219/8.5
[58] Field of Search ............... 219/10.77, 10.75, 10.71, 219/10.69, 10.41, 8.5, 10.43, 486

[56] References Cited

U.S. PATENT DOCUMENTS

| | | | |
|---|---|---|---|
| 1,981,631 | 11/1934 | Northrup | 219/10.77 |
| 2,724,037 | 11/1955 | Bock | 219/10.77 |
| 2,813,186 | 11/1957 | Bock | 219/10.77 |
| 3,057,985 | 10/1962 | Biringer | 219/10.75 |
| 3,398,252 | 8/1968 | Bock et al. | 219/10.77 |
| 3,567,895 | 3/1971 | Paz | 219/10.77 |
| 3,610,861 | 10/1971 | Storey et al. | 219/10.77 |
| 3,614,366 | 10/1971 | Huchok | 219/10.77 |
| 3,689,726 | 9/1972 | Howell | 219/10.75 |
| 3,743,808 | 7/1973 | Kasper | 219/10.77 |
| 4,093,839 | 6/1978 | Moliterno et al. | 219/10.71 |

FOREIGN PATENT DOCUMENTS

2704451 8/1977 Fed. Rep. of Germany ... 219/10.77

*Primary Examiner*—Gene Z. Rubinson
*Assistant Examiner*—Philip H. Leung
*Attorney, Agent, or Firm*—Wenderoth, Lind & Ponack

[57] ABSTRACT

A method of heating a long metal product to a desired temperature by an induction heating coil while continuously moving the long metal product longitudinally. The long metal product thus heated attains a uniform temperature throughout its entire length. For this purpose, the space enclosed by the induction heating coil is hypothetically divided into a plurality of sections in the direction in which the long metal product travels. The temperature of the long metal product in each hypothetically divided section is estimated by calculation from the temperature of the long metal product at the inlet of the induction heating coil. Based on the estimated temperatures, the power supplied to the induction heating coil is controlled so that the temperature of the long metal product agrees with the desired temperature at the outlet of the induction heating coil.

3 Claims, 9 Drawing Figures

INDUCTION HEATING METHOD FOR METAL PRODUCTS

This is a continuation-in-part of Ser. No. 764,909 filed Feb. 1, 1977, now abandoned.

BACKGROUND OF THE INVENTION

This invention relates to a method of uniformly heating a long metal product, such as a steel pipe, to a desired temperature throughout its entire length by passing the product through one or more induction heating coils longitudinally disposed.

A steel pipe or other long metal products heated for heat treatment should attain a longitudinally uniform temperature. Otherwise, the heat-treated piece would involve quality irregularities and fail to satisfy the customer's requirements. The size of a long metal product may often vary along its length. For example, the wall thickness of a steel pipe generally varies longitudinally within the range of approximately 10 percent. Therefore, even if such a steel pipe is heated to 900° C., the resulting pipe temperature cannot be free from a longitudinal variation of approximately 90° C. Meanwhile, the temperature deviation usually permissible in such heat treatment may be approximately plus/minus 30° C. Not only the wall thickness variation, but also variations in material properties, heating conditions and other factors bring about the temperature variation in the heated product. Accordingly, controlled heating is indispensable to the heating of long metal products to a desired temperature.

According to a conventional induction heating technique for long metal products, the temperature of a product at the outlet of the induction heating coil is measured and compared with the desired temperature, and one or more of such parameters as the amperage and frequency of the current supplied to the induction heating coil and the traveling speed of the product are changed to minimize the difference between the two temperatures.

This type of feedback control, however, involves a problem. When the operating parameters are changed by inputting the correction data based on the measured results, the product (the long metal products will be represented by the steel pipe in the following description of this specification) has already advanced a considerable distance, so that the difference between the measured and desired temperatures does not agree with the temperature correction amount required for that portion of the pipe which is passing through the induction heating coil when the correction is made.

This control delay is likely to cause hunting when, for example, the current supplied to the induction heating coil is increased based on the information that the measured temperature was lower than the desired one but the temperature of the pipe in the coil has become higher than the desired one when the increased current is applied.

Another technique disclosed by U.S. Pat. No. 1,981,631 measures the temperature of the product before it enters the induction heating coil to determine its difference from the desired temperature. Based on this data, the rate of inductive heating is automatically changed to eliminate the difference.

With these conventional techniques, however, it is very difficult or impossible to uniformly heat such products as steel pipe whose wall thickness is not uniform throughout. This is because they have no way of knowing the pipe temperature distribution in the induction heating coil, so that they cannot control heating in conformance therewith with quick follow-up and high accuracy.

SUMMARY OF THE INVENTION

This invention has solved the aforementioned problems with the conventional induction heating techniques.

An object of this invention is to provide an induction heating method for metal products that can heat the piece efficiently and uniformly.

Another object of this invention is to provide an induction heating method for metal products that can minimize the deviation from the desired temperature even in the piece whose wall thickness varies.

To achieve these objects, the inventors have created the following technique.

The space enclosed by the induction heating coil is hypothetically divided into a plurality of sections in the direction in which the steel pipe travels. The temperature of the steel pipe in each hypothetically divided section is estimated by calculation from the temperature of the steel pipe at the inlet of the induction heating coil. This permits determining the longitudinal temperature distribution in the steel pipe throughout the individual sections of the induction heating coil. Based on the longitudinal temperature distribution thus determined, the current supplied to the induction heating coil is controlled so that the temperature of the steel pipe at the outlet of the induction heating coil agrees with the desired temperature.

The steel pipe temperature in each hypothetically divided section of the induction heating coil is calculated by a computer.

The computer memorizes the hypothetically divided sections in the induction heating coil, and outputs ever-changing longitudinal pipe temperature distribution data, divided into the memorized sections.

According to this invention, the computer learns the process of the calculational estimation of the pipe temperature in each hypothetically divided section of the induction heating coil. More specifically, the computer compares the pipe temperature at the outlet of the induction heating coil that is determined from the calculated longitudinal temperature distribution with the actually measured pipe temperature at the coil outlet and feeds back the results to the calculation process. This increases the accuracy of the calculational estimation of the pipe temperature distribution in the induction heating coil.

DESCRIPTION OF THE PREFERRED EMBODIMENT

Figure 1:
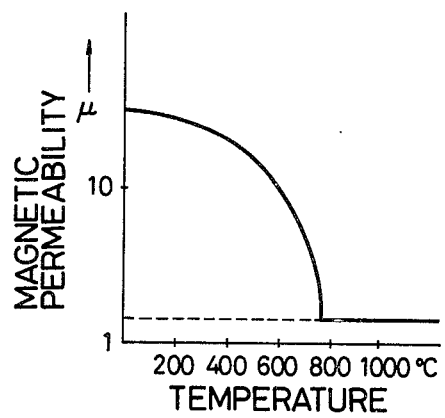
FIG. 1 is a graphical representation of the temperature characteristic of the magnetic permeability $\mu$ of the pipe.

This invention effectively solves the aforementioned technical problems with the conventional induction heating techniques by the following method. The space enclosed by the induction heating coil is hypothetically divided into several sections in the direction in which a steel pipe travels. The temperature of the pipe in each section is calculationally estimated from the temperature of the pipe at the inlet of the induction heating coil. Then, the longitudinal pipe temperature distribution in the induction heating coil is estimated therefrom. Finally, the current supplied to the induction heating coil is controlled on the basis of the estimated temperature distribution so that the pipe temperature at the coil outlet agrees with the desired temperature.

Furthermore, this invention compares the hypothetical pipe temperature at the coil oulet, which is estimated from the calculated longitudinal temperature distribution, with the actual pipe temperature measured at the coil outlet, and feeds back the results to the sectional pipe temperature calculation process to increase the temperature distribution estimation accuracy.

Now, the following paragraphs describe the method of hypothetically dividing the space enclosed by the induction heating coil and determining the pipe temperature in each hypothetically divided section.

According to this invention, the space enclosed by the induction heating coil is hypothetically divided into several sections in the direction in which a steel pipe travels. The temperatures at specific points of the pipe are determined at the inlet of the induction heating coil, either by actual measurement or calculation. When each point enters each hypothetical section in the coil, the temperature thereat is determined from its temperature at the coil inlet and the temperature rise due to the heating that as been given up to that point.

Thus, the pipe temperature in each hypothetical section is calculationally estimated, and the longitudinal pipe temperature distribution in the induction heating coil is established. From this temperature distribution, the pipe temperature at the coil outlet can be determined. If this pipe temperature differs from the desired temperature, the current supplied to the induction heating coil, for example, is controlled to eliminate the difference. This control may be given either to each hypothetical section, or to a group of several sections so that such deviation as the RMS (root-mean-square) value of the group is minimized.

The hypothetically divided section should have a length equal to the distance, or an integral multiple thereof, covered by the pipe during the time interval between the adjacent two time points at which the pipe temperature is measured at the inlet of the induction heating coil. The current supplied to the induction heating coil may be controlled also on the basis of the pipe temperature in a particular section specifically selected out of the hypothetically divided sections. This specific section should be distant enough from the outlet of the induction heating coil so that the deviated pipe temperature can be adjusted to the desired one therebetween.

The hypothetical, longitudinal division of the induction heating coil can be accomplished spontaneously by calculationally determining the pipe temperature in the coil at the points that are spaced away from each other by the aforementioned covered distance between the individual two time points, everytime the pipe temperature is measured at the inlet of the induction heating coil.

Using the function defined by the theory of P. G. Simpson, the energy Pw inputted in the metal product is expressed as $$Pw = fQIc^2 \tag{1}$$

where
f = frequency
Ic = current in the coil
Q = function of penetration depth $\delta$, product thickness t, magnetic permeability $\mu$, etc.

When the metal product is a steel pipe, the Q function is expressed as $$Q = \frac{5.0\mu r^2}{1 + r^2} \left( \frac{Nc}{80lc} \right)^2$$

where r = $2\pi^2$ftdw/R
dw = pipe diameter
R = resistivity of the pipe
Nc = No. of coil windings
lc = coil length Meanwhile, the temperature rise $\Delta T$ in the pipe is expressed as $$\Delta T = \frac{Pw \times \eta}{4.18 Cp\rho} \times \Delta\tau \tag{2}$$

where
Cp = specific heat
$\rho$ = specific gravity
$\eta$ = heating efficiency
$\Delta\tau$ = heating time From equations (1) and (2)

$$\Delta T = (\eta f Q I^2 c/4.18 Cp\rho\sigma)\Delta\tau \tag{3}$$

Therefore, the temperature Tc of the pipe in the coil after the time $\Delta\tau$, with the pipe temperature at the coil inlet being Ti, is expressed as $$Tc = Ti + (\eta f Q I^2 c/4.18 Cp\rho\sigma)\Delta\tau \tag{4}$$

The pipe temperature after the elapse of the time $\Delta\tau$ can be estimated as described above.

The accuracy of this estimation can be increased by longitudinally dividing the coil and estimating the temperature pattern therein or the temperature in each longitudinal section by calculation.

With Cp and Q becoming functions of temperature, the standard pattern for each section can be given preliminarily, if the reference temperature at the coil inlet and the desired temperature at the coil outlet are established.

Accordingly, let us take up the l-th section and assume that $$Q(l)/4.18 Cp(l)\rho = k(l) \tag{5}$$

Then, the pipe temperature Tcl at the outlet of the l-th section is expressed as $$Tc(l) = Ti(l) + \eta \sum_{j=1}^{l} fI^2 c(j)k(j)\Delta\tau \tag{6}$$

where

Ti(l) = pipe temperature at the inlet of the heating coil
Ic(j) = current actually supplied when the pipe passed through the j-th section
$\Delta\tau$ = time for the pipe to pass through one section The temperature rise pattern in the coil can be determined from the temperatures estimated for the individual sections.

Assuming that the controlled current Ic is maintained and the number of sections is N, the estimated pipe temperature Toc(l) at the coil outlet is expressed as $$\Delta Toc(l) = Tc(l) + \eta I^2 c \sum_{m=l+1}^{N} fk(m)\Delta\tau \tag{7}$$

By solving this equation, the pipe temperature at the coil outlet can be estimated.

If the desired temperature is $T_t$, the deviation $\Delta Tec(l)$ in the estimated temperature at the coil outlet is expressed $$\Delta Tec(l) = \tau t - Toc(l) = \tau t - Tc(l) - \eta I^2 c \sum_{m=l+1}^{N} fk(m)\Delta\tau \tag{8}$$

From equation (8), therefore, the estimated current Ic(l) that makes Tec(l)=0 is expressed as $$Ic(l) = \sqrt{\frac{Tt - Tc(l)}{\eta \sum_{m=l+1}^{N} fk(m)\Delta\tau}} \tag{9}$$

Thus, the estimated current for each section is determined.

Let us average the currents for the m-th (m=N/2) and subsequent sections closer to the outlet, then $$Ic = \frac{\sum_{l=m}^{N} Ic(l)}{(N-m)} \tag{10}$$

To increase the estimation accuracy, calculate the outlet temperature from the following equation.

$$T_{CN} = T_{iN} + \eta \sum_{l=1}^{N} fI^2 c(l)k(l)\Delta\tau \tag{11}$$

Then, the actual pipe temperature Tcnr at the outlet is expressed as $$\frac{T_{CNr} - T_{iN}}{T_{CN} - T_{iN}} \times \eta = \eta R \tag{12}$$

By applying the exponential smoothing method to $\eta R$, $$\eta = \alpha\eta + (1-\alpha)\eta_R \tag{13}$$

where $\alpha$ = smoothing exponential employed in the exponential smoothing method.

The estimation accuracy can be increased by substituting in equation (9) the heating efficiency $\eta$ derived from equation (13).

Figure 2:
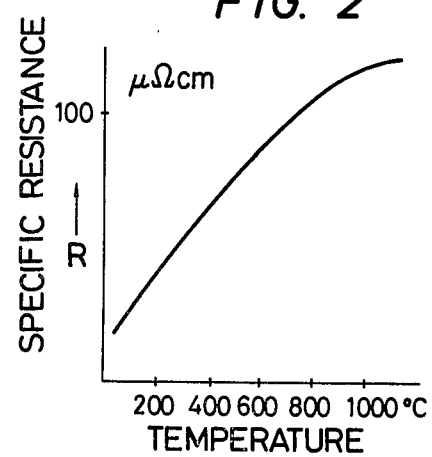
FIG. 2 is a graphical representation of the temperature characteristic of the resistivity R of the pipe.
Figure 3:
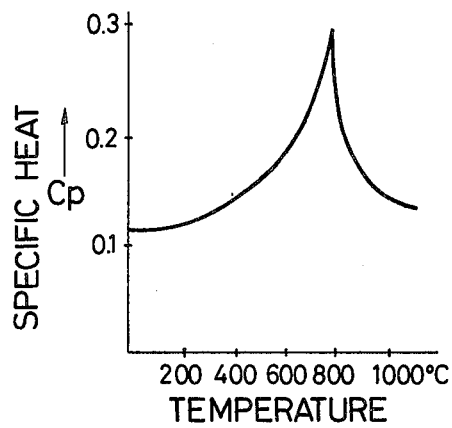
FIG. 3 is a graphical representation of the temperature characteristic of the specific heat Cp of the pipe.

The magnetic permeability $\mu$, resistivity R and specific heat Cp of the product have the temperature characteristics shown in FIGS. 1, 2 and 3, respectively. In the above calculation, however, their characteristic values corresponding to the mean temperature may be used. The number of the hypothetical sections in the heating coil may be determined in accordance with the intervals of the longitudinal dimensional fluctuations in the product. Therefore, when the product is a seamless pipe or a structural shape, the heating coil is hypothetically divided at 50 to 100 mm intervals. For a steel plate, the intervals range between approximately 200 and 500 mm.

This invention will be better embodied if the following knowledge is added to the above-described basic principle.

Let us consider frequency, one of the controllable parameters in the induction heating of the pipe. When steel pipes of different wall thicknesses are heated in an induction heating coil to which current of a constant amperage and frequency is supplied, the maximum heating efficiency is obtained with a specific wall thickness.

Figure 4:
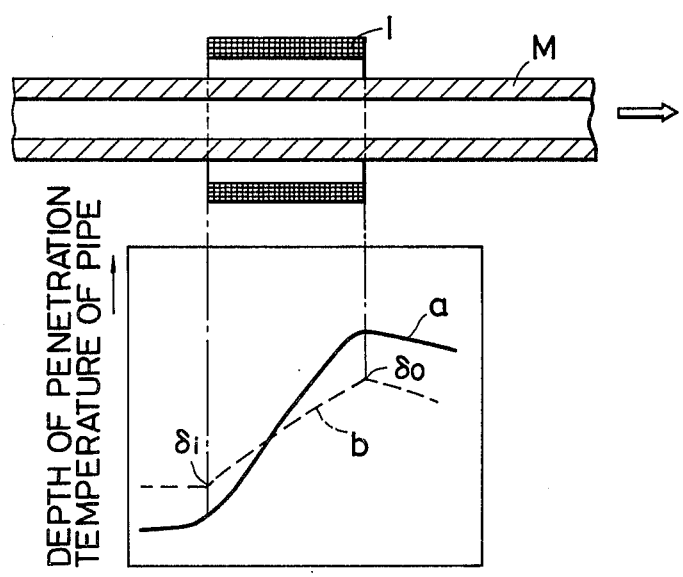
FIG. 4 shows two curves; one is a plot of the temperature rise in the pipe that passes through the induction heating coil at a constant speed, and the other plots the penetration depth of the induced current that changes with the temperature rise.

In FIG. 4 are shown a curve a that plots the temperature rise in the pipe M heated in the induction heating coil I, and a curve b that plots the penetration depth of the current induced into the pipe. In FIG. 4, $\delta i$ and $\delta o$ represent the minimum and maximum penetration depths of the induced current at the inlet and outlet of the heating coil I, respectively.

Figure 5:
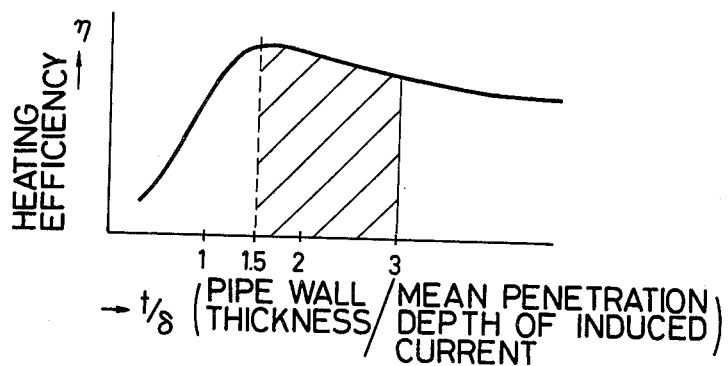
FIG. 5 plots the relationship between the ratio of the pipe wall thickness to the mean penetration depth of the induced current and the heating efficiency, with the frequency and amperage of the heating currency, the traveling speed and initial temperature of the pipe, and the specifications of the induction heating coil being fixed.

As shown in FIG. 5, the maximum heating efficiency is obtained when $t/\overline{\delta} = 1.5$ to 3, where $\overline{\delta}$ = mean penetration depth of induced current and t = pipe wall thickness.

Here, $\overline{\delta}$ is expressed as $$\overline{\delta} = (\delta i + \delta o)/2 \tag{14}$$

The current penetration depth $\delta$ (cm) in the pipe in the induction heating coil is expressed as $$\delta = 5.03 \sqrt{\frac{\rho}{f\mu}} \tag{15}$$

Therefore, when the wall thickness of the pipe to be heated is given, the maximum heating efficiency will be obtained by selecting, for example, a suitable frequency so that $t/\overline{\delta}$ becomes 1.5 to 3.

In actual calculation, the mean wall thickness $\overline{t}$ averaged over the pipe length is used as the pipe wall thickness t, which is expressed as $$\overline{t} = (t \max + t \min)/2 \tag{16}$$

Figure 6:
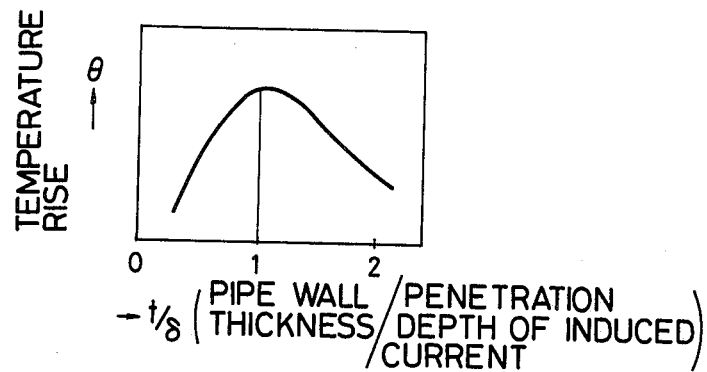
FIG. 6 plots the relationship between the wall-thickness-to-penetration-depth ratio and the increase in pipe temperature under the same conditions as in FIG. 5.

FIG. 6 shows the relationship between the ratio, $t/\delta$, of the pipe wall thickness t to the current penetration depth $\delta$.

When $t/\delta$ is 1 or thereabout, the temperature rise $\theta$ becomes maximum. At this point, therefore, the ratio, $\Delta\theta/\Delta t$, of the temperature change $\Delta\theta$ to the wall thickness change $\Delta t$ becomes zero or becomes comparably small. The inventors have theoretically and empirically confirmed that the mean wall thickness change $\bar{t}$ averaged over the pipe length and the mean current penetration depth $\bar{\delta}=(\delta i+\delta o)/2$ (i.e., the mean value of the penetration depths $\delta i$ and $\delta o$ at the inlet and outlet of the heating coil) can be used in place of t and $\delta$. Even then, the ratio $\Delta\theta/\overline{\Delta t}$ becomes zero or becomes comparably small so far as $\overline{t/\delta}=1$. In practice, the mean value of the maximum wall thickness $t_{max}$ and the minimum wall thickness $$t_{min}\left(\bar{t}=\frac{t\max + t\min}{2}\right)$$

may be used as $\bar{t}$.

If, therefore, the frequency of the power supplied to the induction heating coil is selected so that $\overline{t/\delta}=1$, the longitudinal temperature variation at the coil outlet, which is due to the longitudinal variation in pipe wall thickness, can be minimized.

In a induction heating apparatus comprising a plurality (n pieces) of heating coils, the mean penetration depth $\bar{\delta}_T$ averaged over the all coils can be expressed as follows, if the mean penetration depth of the j-th coil is $\bar{\delta}_j$:

$$\bar{\delta}_T = \frac{1}{n}\sum_{j=1}^{n}\bar{\delta}_j \qquad (17)$$

The uniformity in the heated pipe temperature should be attained at the outlet of the last coil in the heating apparatus. For the heating with n pieces of coils, it has also been confirmed that the pipe can be uniformly heated throughout its length if the condition $\overline{t/\delta_T}=1$ is satisfied in place of $\overline{t/\delta}=1$.

Generally in heating with n pieces of coils, however, the frequencies for the 1st to m-th coils are selected so that the maximum heating efficiency can be obtained. Then, the relationship between the mean penetration depth $\bar{\delta}_{1\sim m}$ averaged over the 1st to m-th coils supplied with such frequencies and the mean pipe wall thickness $\bar{t}$ is expressed as $$\bar{\delta}_{1\sim m}<\bar{t}\ (\overline{t/\delta_T}>1)$$

Therefore, the temperature variations due to the longitudinal wall-thickness variations can be minimized if the frequencies for the m+1st to n-th coils are selected so that the condition $\overline{t/\delta_{m+1\sim n}}<1$ for these coils and the condition $\overline{t/\delta_T}=1$ for the entirety be satisfied.

Even a pipe involving wall-thickness variations can be uniformly heated with higher accuracy by adding these factors to the previously described method of controlling the pipe heating temperature based on the estimated pipe temperature distribution in the hypothetically divided sections in the induction heating coil. When a pipe has the maximum wall thickness $t_{max}$ and the minimum wall thickness $t_{min}$, their mean value $\bar{t}=(t_{max}+t_{min})/2$. If, for example, the frequency of the power supplied to the induction heating coil is selected so that $\overline{t/\delta_T}=1(\overline{\delta_T=\bar{t}})$, in addition to the application of the previously described basic principle, deviations in the heating temperature can be eliminated stably.

If the frequency maximizing the heating efficiency and the frequency minimizing the temperature deviation are substantially equal, the object of this invention will be achieved with such a frequency. Usually, however, the frequency minimizing the temperature deviation, selected by the above-described method, is such a low frequency as is commercially employed. From the viewpoint of efficiency, this low frequency cannot favorably be used for all heating coils. Accordingly, the temperature deviation is decreased as much as possible by distributing frequency and power so that the maximum efficiency be attained in the first-half heating coils and the substantially minimized temperature deviation in the second-half coils, and also employing the above-described temperature control technique.

Figure 7:
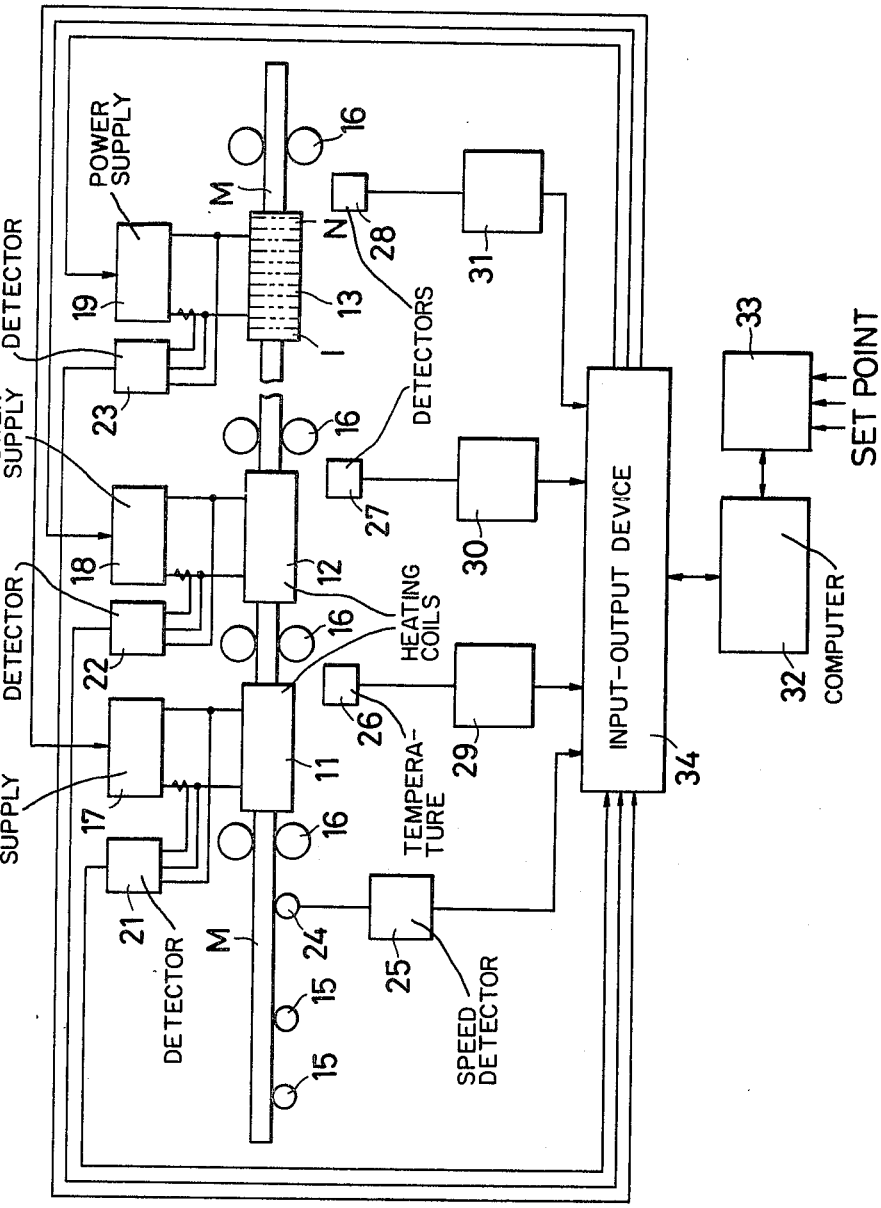
FIG. 7 exemplifies the construction of an apparatus for putting the method of this invention into practice.

Now, an apparatus for practicing the method of this invention will be described. FIG. 7 shows a heating apparatus including a control device. As seen, induction heating coils 11, 12 and 13 are disposed in tandem, in the direction in which a steel pipe M travels. A table roller 15 and a pinch roller 16 for passing forward the pipe M are provided in the traveling direction.

Power supplies 17, 18 and 19 connect to said induction heating coils 11, 12 and 13, respectively. The power supplies 17, 18 and 19 comprise thyristor inverter or such other a.c. power supplies which can continuously control voltage, current and frequency. Power supply detecting devices 21, 22 and 23 connect to the output side of the power supplies 17, 18 and 19, respectively. The power supply detecting devices 21, 22 and 23 each comprise a potential transformer to detect coil voltage, a current transformer to detect coil current, and a pulse counter to detect coil frequency.

A measuring roll 24 to detect the traveling speed of the pipe M is provided on the inlet side of the first heating coil 11. A speed detector 25, such as a speed generator, to detect the rotating speed connects to the measuring roll 24.

Non-contact temperature detectors 26, 27 and 28, such as radiation thermometers, are provided on the outlet side of the induction heating coils 11, 12 and 13, respectively. Temperature detecting devices 29, 30 and 31 connect to the non-contact temperature detectors 26, 27 and 28, respectively. Each comprising a linearizer and a current-to-current insulating amplifier, the temperature detecting devices 29, 30 and 31 convert the signals from the temperature detectors 26, 27 and 28 into linear analog signals.

This heating apparatus has a control computer 32. The computer 32 is such a general-purpose computer as IBM 1800. The reference speed, properties (specific gravity, heat and resistivity and magnetic permeability), reference dimensions, desired heating temperature and reference temperatures at the coil inlet and outlet of the pipe M, specifications and the number of sections of the heating coils, and other data are inputted through a data-processing input-output device 33 into the computer 32. The analog signals from the power supply detecting devices 21, 22 and 23, the speed detector 25, and the temperature detecting devices 29, 30 and 31 are converted into digital signals and inputted through a process input-output device 34 into the computer 32. The calculation results based on these input data are converted from digital to analog, then fed through the process input-output device 34 to the power supplies 17, 18 and 19 as control signals.

Next, a concrete application of this method will be described by reference to the heating of a steel pipe, having an outside diameter of 100 mm and a wall thickness of 10 mm, from the ambient temperature (20° C.) to 600° C., using the above-described heating apparatus.

In this example, three induction heating coils are arranged in tandem. To achieve the maximum heating efficiency in the Nos. 1 and 2 heating coils, the frequencies supplied thereto are selected so that the ratio $\overline{t/\delta}$ falls within the range between 1.5 and 3. Also, the frequency f to the No. 3 heating coil is selected so that the ratio $\overline{t/\delta_T}$ for all the coils becomes equal to 1 or thereabout.

The space enclosed by the No. 3 heating coil is hypothetically divided into 10 equal sections in the direction in which the pipe travels. The computer calculationally estimates ever-changing temperatures in each section, and continuously outputs the pipe temperature distribution in the No. 3 induction heating coil. Based on the longitudinal temperature distribution data thus outputted, the power supplied to the No. 3 heating coil is controlled so that the pipe temperature at the outlet thereof becomes 600° C.

This permits the high-accuracy induction heating of steel pipe.

Fed at a constant speed by the table roller 15 and the pinch roller 16, the pipe M is continuously heated to the desired temperature through the induction heating coils 11, 12 and 13. The pipe M travels at a speed of 1 m per minute. The heating conditions are set so that the No. 1 coil 11 heats the pipe M from 20° C. to 300° C., the No. 2 coil 12 from 300° C. to 500° C., then the No. 3 coil 13 from 500° C. to 600° C. The frequencies supplied to the Nos. 1 and 2 coils 11 and 12 are controlled so that the mean penetration depth of the induced current $\overline{\delta}$ in the pipe M becomes equal to ($\frac{1}{3}$ to $\frac{2}{3}$)t. Namely, the frequency f for the No. 1 heating coil 11 is set at 200 Hz. Then, the penetration depth at the inlet and outlet of the coil 11 are 2.8 mm and 3.8 mm, respectively. With the ratio $t/\overline{\delta}$ equalling 3, the aforementioned requirement is satisfied. Similarly, the frequency f for the No. 2 coil 12 is set at 440 Hz; then $\overline{t/\delta}=3$ again. Consequently, the heating coils 11 and 12 heat the pipe M with the highest possible efficiency. To minimize the longitudinal temperature variations due to the longitudinal wall thickness variations, the frequency for the No. 3 heating coil 13 should be selected so that the ratio $\overline{t/\delta}$ equals 1. Here, the frequency f is 15 Hz. Then, $\overline{\delta_T} \approx 9.5$, and the ratio $\overline{t/\delta_T} = 1.05 (\approx 1)$, which indicates the existence of considerably limited temperature variations.

Based on the hypothetically divided sections in the No. 3 heating coil 13, the temperature distribution therein is determined and the power supplied thereto is controlled accordingly. In this example, the heating coil 13, which is 1 m long, is hypothetically divided into 10 sections 100 mm long each.

The temperature detector 27 on the inlet side of the No. 3 heating coil 13, or on the outlet side of the No. 2 heating coil 12, measures the temperature of the pipe M at intervals each of which is equal to the length of said section. Similarly, the temperature detector 28 measures the pipe temperature on the outlet side of the No. 3 heating coil 13. The power supply detecting device 23 detects the current Ic and the frequency f of the power Pw supplied to the No. 3 heating coil 13. The detection signals thus obtained are fed through the process input-output device 34 into the computer 32. Based on the pipe temperature at the inlet of the No. 3 heating coil 13, the computer 32 calculates the temperature distribution in the coil 13, then determines the optimum coil current.

Figure 8:
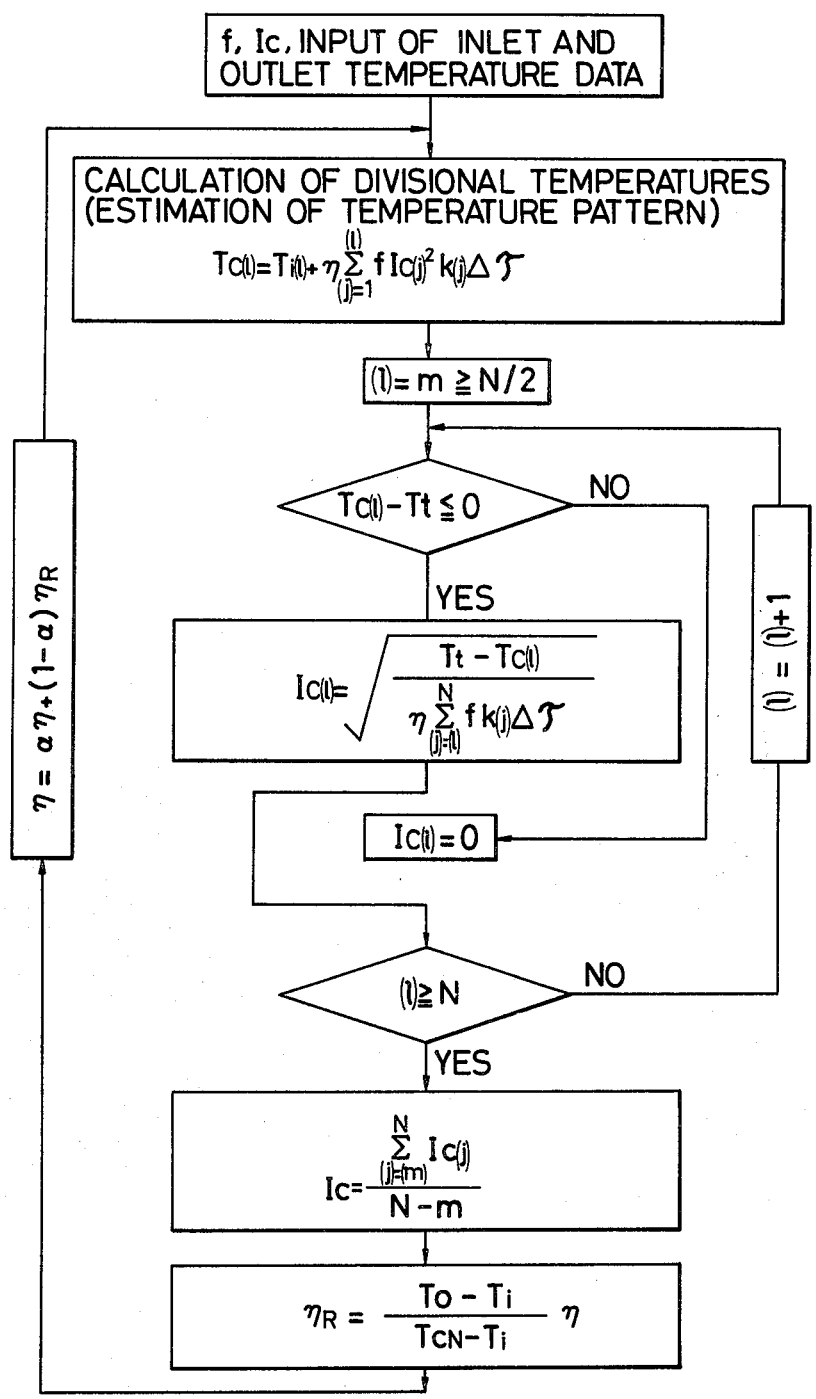
FIG. 8 is a flow chart for computing the pipe temperature in each section of the induction heating coil.

By reference to a flow chart in FIG. 8, the process of calculation performed by the computer 32 will be described in detail.

First, the computer 32 is inputted with the frequency f and the current Ic of the power supplied to the heating coil 13 and the temperatures Ti and To of the pipe M on the inlet and outlet sides thereof. Then, the temperature Tc(l) in each section of the heating coil 13 is determined from the inlet temperature Ti(l), using equation (6) given before. The deviation between the desired temperature Tt and the estimated temperature Tc(l) ($l \geq 7$) for each of the m-th ($m \geq N/2$; here $N=10$ and $m=7$) and subsequent sections is determined. If $Tc(l)-Tt>0$, the coil current $Ic(l)=0$. If $Tc(l)-Tt \leq 0$, the coil current Ic(l) for the l-th section is derived from equation (9). Thus, the coil currents Ic(l) for the m-th to N-th coils (here 7th to 10th) are determined, which are averaged to the mean current Ic that is adopted as the control current. The coil current is controlled by repeating this computation every time the aforementioned pipe temperature measurement is performed, or every time the pipe M advances a distance equal to one section.

The actual heating efficiency $\eta$ is determined from equation (12), and fed back to the process that calculates the temperature in the l-th section. This furthers the accuracy of this temperature control method.

Figure 9:
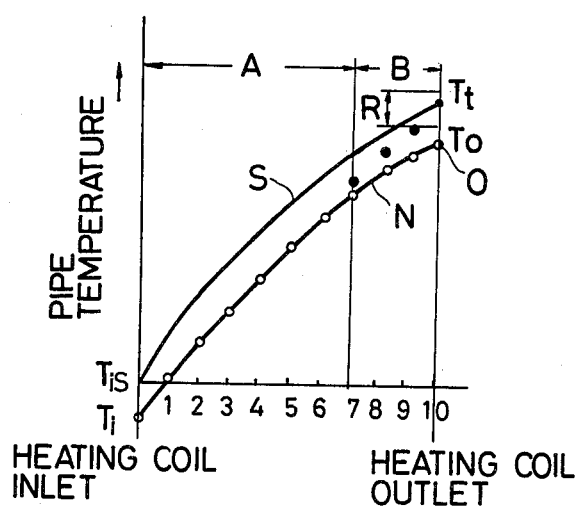
FIG. 9 shows a graph that plots the pipe temperature rise in the induction heating coil of this invention.

A graph in FIG. 9 shows how this temperature control is performed. The position of the individual sections in the No. 3 heating coil 13 is indicated along the x-axis, and the temperature of the pipe M along the y-axis. Curve S is a plot of the reference temperature pattern of the pipe M that enters the heating coil 13 with a reference temperature Tis. The pipe is heated to the desired temperature Tt at the outlet thereof. Curve N plots the temperature pattern of the pipe M that enters the coil 13 with a temperature Ti, which is lower than the reference temperature Tis, and is heated uncontrolledly. The outlet temperature To does not reach the desired temperature Tt, and does not come within the allowable tolerance R. Hollow circles show the temperatures in the individual sections determined by the above-described calculation. In the area A, temperatures are calculated to estimate the temperatures in the following area B. In the area B, temperatures are estimated on the basis of the temperatures calculated in the preceding area A. The estimated temperatures are compared with the desired temperature Tt, then the coil current is controlled on the basis of the deviations therebetween so that the temperatures indicated by solid circles are attained.

The method according to this invention permits continuously heating the long metal products to a temperature tolerance of plus/minus 3 percent. Instead of hypothetically dividing a heating coil, a plurality of small heating coils may be arranged in tandem, so that such coils are controlled individually. For example, one 1000 kw heating coil may be supplanted by ten 100 kw heating coils. But this change will make the apparatus complex and call for considerably greater capital investment.

In the above-described embodiment, the temperature control according to this invention is applied to the No. 3 heating coil only. But the same temperature control may be applied to all the heating coils to further increase the heating accuracy. The method of this invention is also applicable to an apparatus that comprises one heating coil.

What is claimed is:

1. An induction heating method for metal products that continuously heats to a desired temperature a long metal product traveling at a constant speed through a longitudinally disposed induction heating coil, comprising the steps of:

successively measuring the temperature of the metal product on the inlet side of the heating coil at longitudinal intervals thereof, each said interval being shorter than one-half of the heating coil length;

calculating the longitudinally distributed temperatures of the metal product in the heating coil from the measured temperatures every time said temperature measurement is performed;

determining the deviations between the calculated temperatures for the area closer to the outlet of the heating coil and the desired temperature; and controlling the power supplied to the heating coil based on the determined deviations so that the product temperature on the outlet side of the heating coil equals the desired temperature.

2. An induction heating method for metal products that continuously heats to a desired temperature a long metal product traveling at a constant speed through a plurality of induction heating coils disposed longitudinally and in tandem, comprising the steps of:

controlling the frequency of the power supplied to the heating coils of the first-half groups so that the mean penetration depth of induced current in the metal product $\overline{\delta}$ therefor equals ($\frac{1}{3}$ to $\frac{2}{3}$)t (wherein t=wall thickness of the product);

selecting and setting the frequency of the power supplied to the heating coils of the second-half group so that the ratio $\overline{t/\delta_T}$ for the whole heating coils equals 1 (wherein t=mean wall thickness of the product, and $\overline{\delta_T}$=mean penetration depth for all heating coils of the second-half group);

successively measuring the temperature of the metal product on the inlet side of the heating coil at longitudinal intervals thereof, each said interval being shorter than one-half of the heating coil length;

calculating the longitudinally distributed temperatures of the metal product in the heating coil from the measured temperatures every time said temperature measurement is performed;

determining the deviations between the calculated temperatures for the area closer to the outlet of the heating coil and the desired temperatures; and controlling the power supplied to the heating coil based on the determined deviations so that the product temperature on the outlet side of the heating coil equals the desired temperature.

3. An induction heating method for heating an elongated piece of metal moving continuously in a longitudinal direction, comprising the steps of:

measuring the inlet temperature of the metal at longitudinal intervals with a non-contact thermometer located at the entry side of an induction heating coil;

sectioning the induction heating coil into a plurality of successive sections in the longitudinal direction thereof, said sections equal in length to the longitudinal interval;

detecting the speed of the metal by means of a speed detector;

tracking the relative position between the metal and the induction heating coil by integrating the speed detected by the speed detector;

measuring the voltage, current, and frequency of the electrical power applied to the induction heating coil;

calculating the temperature of the metal in each respective section of the induction heating coil using the measured inlet temperature and speed of the metal and the measured voltage, current, and frequency of the electrical power applied to the induction heating coil;

estimating the temperature of the metal at the exit side of the induction heating coil from the calculated temperatures and adjusting the electrical power applied to the induction heating coil to minimize the difference between the estimated metal temperature and the desired metal temperature at the exit side of the induction heating coil.

* * * * *